(12) United States Patent
Takahara

(10) Patent No.: US 8,412,137 B2
(45) Date of Patent: Apr. 2, 2013

(54) RADIO TRANSMITTER

(75) Inventor: Seishi Takahara, Tokyo (JP)

(73) Assignee: TDK Corporation, Tokyo (JP)

( * ) Notice: Subject to any disclaimer, the term of this patent is extended or adjusted under 35 U.S.C. 154(b) by 405 days.

(21) Appl. No.: 12/585,883

(22) Filed: Sep. 28, 2009

(65) Prior Publication Data
US 2010/0081400 A1    Apr. 1, 2010

(30) Foreign Application Priority Data
Sep. 29, 2008 (JP) ................ 2008-251130

(51) Int. Cl.
*H04B 15/00* (2006.01)

(52) U.S. Cl. .......... 455/127.1; 455/63.4; 455/575.5; 455/575.7; 455/121; 455/128

(58) Field of Classification Search .......... 455/63.4, 455/575.5, 575.7, 121, 128, 129, 269
See application file for complete search history.

(56) References Cited

U.S. PATENT DOCUMENTS

| | | | | |
|---|---|---|---|---|
| 4,983,987 A | * | 1/1991 | Woloszczuk | 343/797 |
| 5,327,584 A | * | 7/1994 | Adachi et al. | 455/575.8 |
| 5,376,943 A | * | 12/1994 | Blunden et al. | 343/795 |
| 6,028,555 A | | 2/2000 | Harano | |
| 6,078,791 A | * | 6/2000 | Tuttle et al. | 455/90.1 |
| 7,113,748 B2 | * | 9/2006 | Shapira et al. | 455/63.4 |
| 7,136,018 B2 | * | 11/2006 | Iguchi et al. | 343/702 |
| 7,261,240 B2 | * | 8/2007 | Akiho et al. | 235/492 |
| 7,839,285 B2 | * | 11/2010 | Tuttle | 340/572.1 |

FOREIGN PATENT DOCUMENTS

| | | |
|---|---|---|
| GB | 2 211 024 A | 6/1989 |
| JP | A-2003-8334 | 1/2003 |
| JP | A-2004-363929 | 12/2004 |
| JP | A-2005-98857 | 4/2005 |
| JP | A-2005-109883 | 4/2005 |
| JP | A-2006-148633 | 6/2006 |
| JP | A-2008-177753 | 7/2008 |
| WO | WO 2007/019855 A1 | 2/2007 |

OTHER PUBLICATIONS

European Search Reported dated Sep. 10, 2012 issued in European Patent Application No. 09171626.6.

* cited by examiner

*Primary Examiner* — Yuwen Pan
*Assistant Examiner* — Richard Chan
(74) *Attorney, Agent, or Firm* — Oliff & Berridge, PLC

(57) ABSTRACT

A radio transmitter includes a radio module, a battery from which power is fed to the radio module, and a metal plate. The radio module includes a transmission module generating a transmission signal and an antenna configured to wirelessly transmit the transmission signal. The metal plate is located so as to cover a part of the battery and a part of the antenna. The battery is electromagnetically coupled to the antenna. A main radiation direction of the antenna is parallel to a principal surface of the metal plate.

6 Claims, 3 Drawing Sheets

RADIO TRANSMITTER

BACKGROUND OF THE INVENTION

1. Field of the Invention

The present invention relates to a radio transmitter used in the field of security and the like.

2. Description of the Related Art

For cellular phones, personal computers, and the like, there has been a demand for an automatic password locking/unlocking function or an automatic power on/off function. For automobiles, there has been a demand for an automatic door locking/unlocking function. To meet these demands, various methods have recently been proposed. In a proposed technique, a user carries a radio transmitter with an assigned unique ID. When the user leaves the cellular phone or personal computer, the password is locked. When the user approaches the cellular phone or personal computer, the password is unlocked.

The radio transmitter of this kind is preferably small and thin in connection with portability. In particular, to offer high portability, the radio transmitter is preferably shaped like a card with a minimized thickness which can be housed in a wallet or an employee ID card holder always carried by the user. For example, Japanese Patent Laid-Open No. 2004-363929 describes a keyless entry transmitter as a radio transmitter. The radio transmitter of this kind is carried by the user in a breast pocket, a back pocket, or the like depending on the user's usage. Thus, the radio transmitter preferably offers nondirectionality.

In the conventional radio transmitter, the antenna is designed to offer nondirectionality. However, the conventional antenna design assumes that the radio transmitter is not carried by the human body. Thus, when the user carries a radio transmitter having a radio module, a battery, and the like accommodated in an external case made of resin (for example, an ABS material), electric waves radiated toward the human body may be absorbed by the human body. This may reduce the antenna gain toward the human body. Such a phenomenon may reduce the intensity of the electric wave during radio communication, thus reducing the radio communicable range. Furthermore, the reduction in the antenna gain toward the human body may change the antenna directionality, thus preventing the nondirectionality from being maintained.

Thus, an object of the present invention is to provide a radio transmitter that enables nondirectionality to be offered without reducing the antenna gain while the radio transmitter is being carried by the human body.

SUMMARY OF THE INVENTION

To accomplish the above-described object, a radio transmitter according to the present invention comprises a radio module, a battery from which power is fed to the radio module, and a metal plate. The radio module comprises a transmission module generating a transmission signal and an antenna configured to wirelessly transmit the transmission signal. The metal plate is located so as to cover a part of the battery and a part of the antenna. The battery is electromagnetically coupled to the antenna. A main radiation direction of the antenna is parallel to a principal surface of the metal plate.

In the radio transmitter according to the present invention, with the part of the battery and the part of the antenna covered by the metal plate, antenna characteristics (frequency characteristics, directionality, and the like) are pre-adjusted. The metal plate has a higher dielectric constant than the human body. Thus, even when the radio transmitter with the part of the battery and the part of the antenna covered by the metal plate is carried by the human body, the antenna characteristics are not substantially affected by the human body. Consequently, the frequency characteristics, directionality, and the like of the antenna are not substantially affected.

The metal plate is desirably located so as to cover, in addition to the part of the battery and the part of the antenna, a part of the transmission module. This allows proper nondirectionality to be offered.

Furthermore, since the battery and the antenna are electromagnetically coupled together, not only the antenna but also the whole conductor portion including the battery functions as a radiation conductor. Thus, an antenna offering proper nondirectionality can be obtained. Since the main radiation direction of the antenna is parallel to the principal surface of the metal plate, radiating electric waves are prevented from being blocked by the metal plate.

In a preferred embodiment of the present invention, the metal plate is electromagnetically coupled to the antenna and the battery to function as a radiation conductor. The metal plate serves to prevent the antenna characteristics from being varied under the effect of the human body, and the metal plate itself functions as a radiation conductor. Thus, antenna characteristics including proper nondirectionality can be offered.

In a preferred embodiment of the present invention, the radio transmitter further comprises a mounting substrate having a first principal surface located opposite the metal plate and a second principal surface located opposite the first principal surface. The radio module is formed on the first principal surface, and a ground electrode of the radio module is formed on the second principal surface. This mounting structure allows the distance between the metal plate and the ground electrode to be maximized, enabling a reduction in a possible parasitic capacitance formed between the metal plate and the ground electrode. Thus, the possible degradation of the frequency characteristics caused by the parasitic capacitance can be effectively inhibited.

In a preferred embodiment of the present invention, a position of an electric feeding point of the antenna is set at a corner portion of the mounting substrate so that for a wavelength $\lambda$ of the transmission signal corresponding to a radio frequency, an electrical length of the antenna is set to $\lambda/4$. This antenna structure allows the radiation efficiency of the antenna to be improved.

The present invention can thus provide a radio transmitter that enables nondirectionality to be offered without reducing the antenna gain while the radio transmitter is being carried by the human body.

DESCRIPTION OF THE PREFERRED EMBODIMENTS

A preferred embodiment of the present invention will be described below with reference to the drawings.

Figure 1:
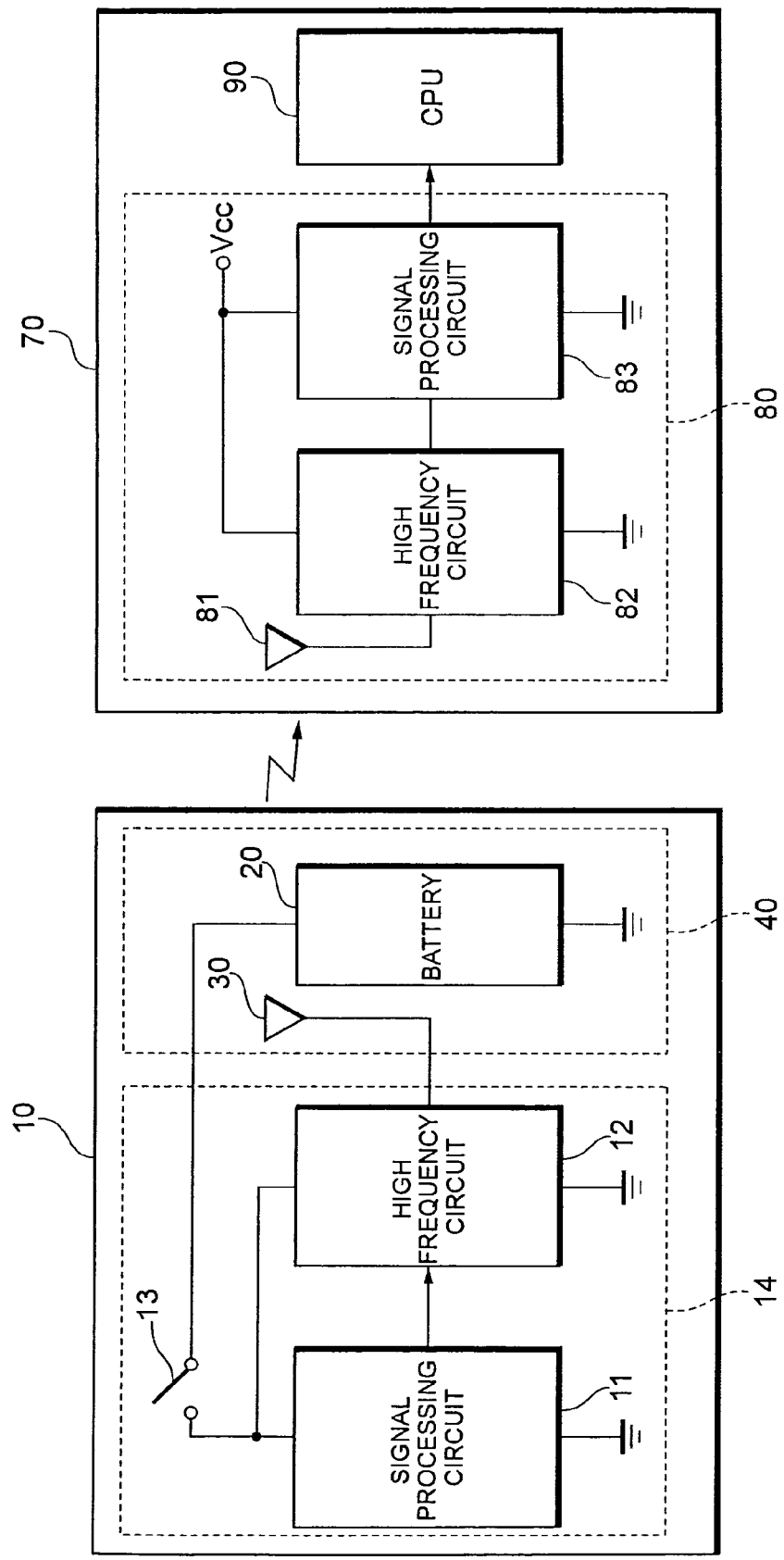
FIG. 1 is a functional block diagram of a radio transmitter and a terminal apparatus according to the present embodiment.

FIG. 1 is a functional block diagram of a radio transmitter 10 and a terminal apparatus 70. The radio transmitter 10 includes a transmission module 14, an antenna 30, a battery 20, and a metal plate 40. The transmission module 14 includes a signal processing circuit 11, a high frequency circuit 12, and a switch 13.

The signal processing circuit 11 is composed of a CPU and a memory IC to perform control for reducing power consumption, a process of outputting an ID number, and the like. The ID number and a communication format are pre-stored in the memory IC. The ID number is unique identification information assigned to the radio transmitter to uniquely identify the radio transmitter. The communication format conforms to a predetermined communication protocol (for example, a power-saving radio communication protocol adapted for a 400 MHz band). Any of various memories such as a nonvolatile memory and a volatile memory is applicable as the memory IC. The CPU reads the communication format from the memory IC together with the ID number. The CPU intermittently and periodically outputs a modulation signal of a predetermined interface format (for example, a UART serial interface format) modulated at a predetermined transfer rate (for example, 9,600 bps), to the high frequency circuit 12. For example, an 8-bit microcomputer may be used as the CPU.

The signal processing circuit 11 performs intermittent operations as the control for reducing the power consumption. For example, during a transmission cycle of 15 seconds, the ID number is output in the predetermined communication format for only a transmission period of 15 msec. For the remaining part of the cycle, that is, a sleep period of 1,485 msec, the operation of the signal processing circuit 11 and the high frequency circuit 12 is set to a sleep mode. The signal processing circuit 11 and the high frequency circuit 12 alternately repeat the transmission mode and the sleep mode to reduce power consumed from the battery 20.

The high frequency circuit 12 is composed of passive components such as a chip inductor, a chip capacitor, and a chip resistor, and semiconductor elements such as transistors. The high frequency circuit 12 receives the modulation signal from the signal processing circuit 11. The high frequency circuit 12 then modulates the signal into a transmission signal (for example, a binary FSK modulation signal with a 300-MHz band) containing the ID number of the radio transmitter 10 according to the communication format. The antenna 30 converts the transmission signal generated by the high frequency circuit 12 into an electromagnetic wave, and radiates the electromagnetic wave. The electromagnetic wave radiated by the antenna 30 is designed so as to conform to weak radio standards for a basic frequency of 315 MHz.

The battery 20 supplies power to the signal processing circuit 11 and the high frequency circuit 12. The battery 20 is, for example, a lithium ion battery, and outputs a rated voltage of 3V DC. Although varying depending on the minimum operation voltage levels of the signal processing circuit 11 and the high frequency circuit 12, power consumed from the battery 20 is between about 1.8V and 3.3V. The switch 13 is a power supply switch enabling or blocking the power supply from the battery 20 to the signal processing circuit 11 and the high frequency circuit 12. To temporarily stop the output of the transmission signal from the radio transmitter 10, the switch 130 is turned off to allow the power supply from the battery 20 to the signal processing circuit 11 and the high frequency circuit 12 to be blocked. Furthermore, to resume the output of the transmission signal from the radio transmitter 10, the switch 130 is turned on to allow the power supply from the battery 20 to the signal processing circuit 11 and the high frequency circuit 12 to be resumed.

The terminal apparatus 70 is, for example, an electronic apparatus such as a cellular phone or a personal computer which provides a radio communication function. The terminal apparatus 70 includes a radio module 80 and a CPU 90. The radio module 80 includes an antenna 81, a high frequency circuit 82, and a signal processing circuit 83. The ID number contained in the transmission signal radiated by the radio transmitter 10 as a radio wave is received by the antenna 81. The ID number is then demodulated by the high frequency circuit 82 and decoded by the signal processing circuit 83. The resulting ID number is output to the CPU 90 in the predetermined interface format (for example, the UART serial interface format). The CPU 90 authenticates the radio transmitter 10 based on the ID number received by the radio module 80. For example, if the terminal apparatus 70 is a cellular phone, when the user carrying the radio transmitter 10 moves away from the terminal apparatus 70 by at least a given distance, the terminal apparatus 70 is locked. When the user carrying the radio transmitter 10 moves back to a position located at a given distance or shorter from the terminal apparatus 70, the terminal apparatus 70 is unlocked.

Figure 2:
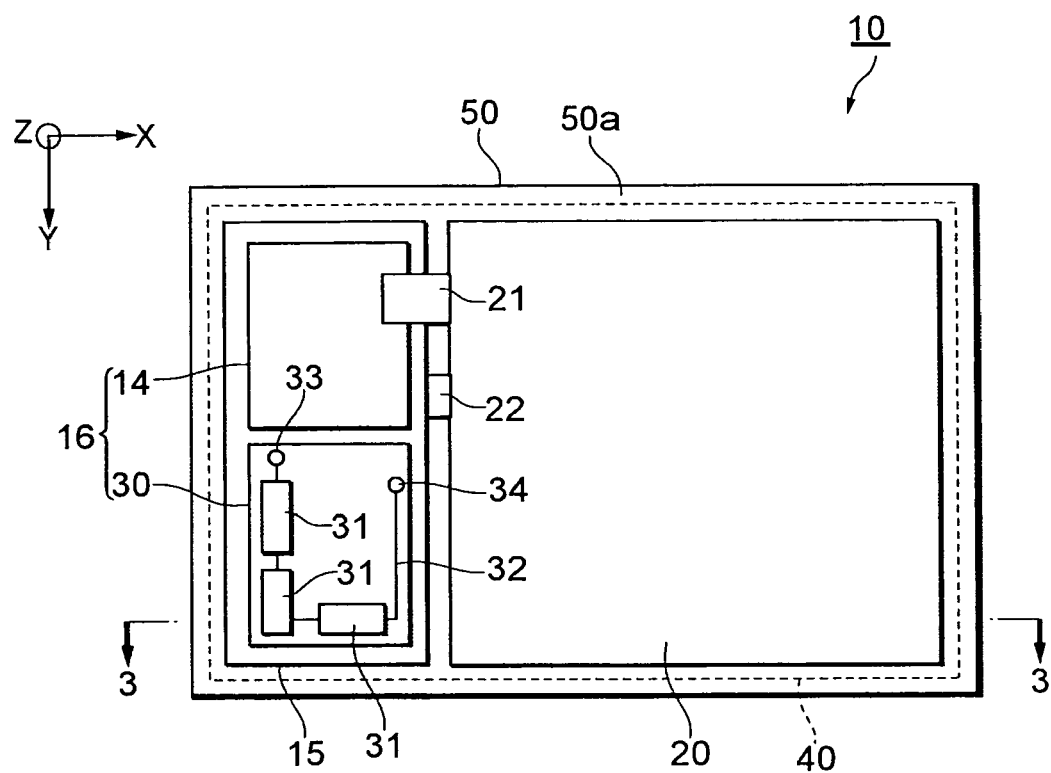
FIG. 2 is a plan view of the radio transmitter according to the present embodiment.
Figure 3:
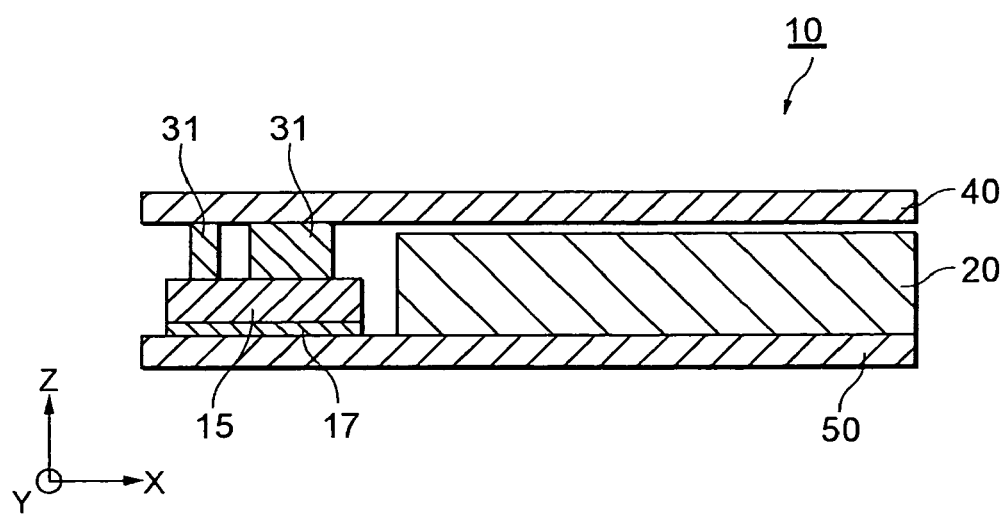
FIG. 3 is a sectional view of the radio transmitter taken along line 3-3 in FIG. 2.
Figure 4:
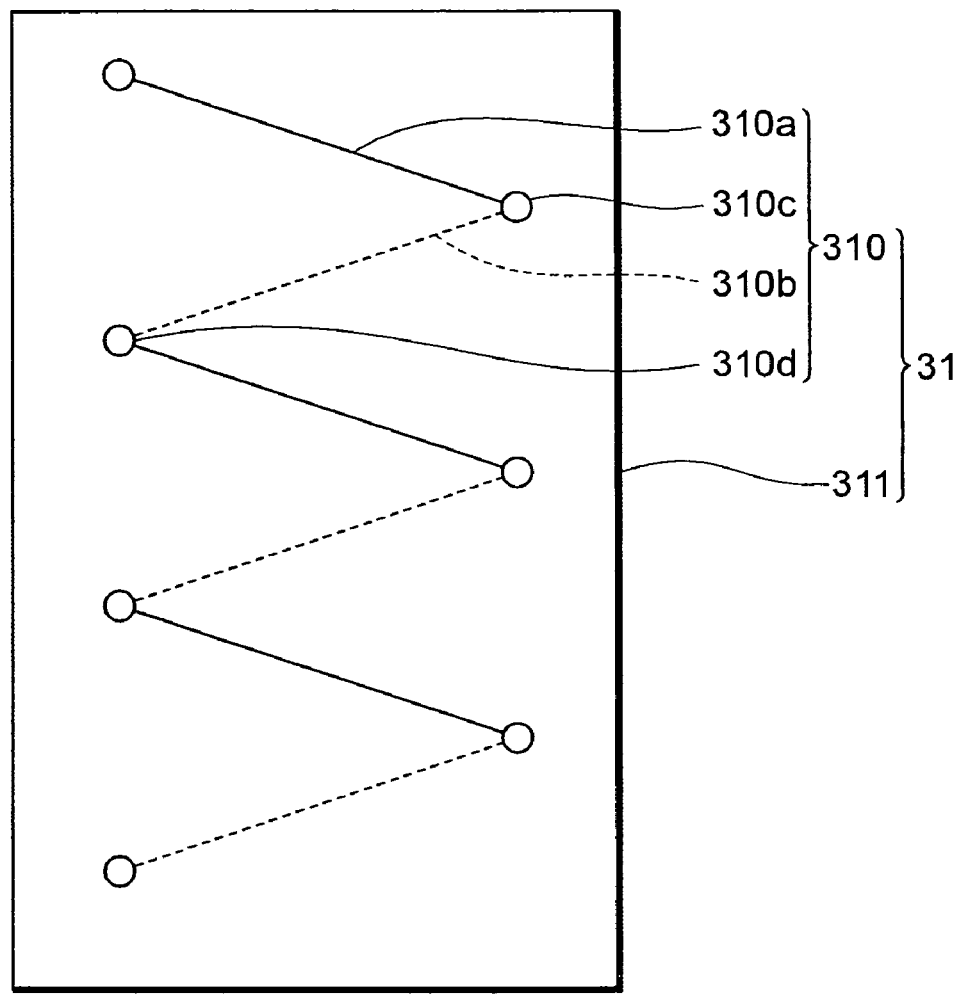
FIG. 4 is a plan view of an antenna element.

Now, the layout of the components of the radio transmitter 10 will be described with reference to FIG. 2 to FIG. 4. FIG. 2 is a plan view of the radio transmitter 10. FIG. 3 is a sectional view of the radio transmitter 10 taken along line 3-3 in FIG. 2. FIG. 4 is a plan view of an antenna element 31. An XYZ orthogonal coordinate system is defined in order to clarify the positional relationship among the components. For two sides forming the bottom surface of the radio transmitter 10, the longitudinal direction is defined as an X direction, whereas the latitudinal direction is defined as a Y direction. The thickness direction of the radio transmitter 10 is defined as a Z direction. However, in FIG. 2, it should be noted that for convenience of description of the internal configuration of the radio transmitter 10, the metal plate 40 is shown by a dashed line.

As shown in FIG. 2 and FIG. 3, an external case 50 of the radio transmitter 10 is shaped like a thin, substantially rectangular card. The dimensions of the external case 50 are, for example, 85×55×1.6 mm. For convenience of description, FIG. 2 and FIG. 3 show only the back surface of the external case 50, with the illustration of the side and front surfaces omitted. The back surface of the external case 50 is defined as a reference plane 50a. The battery 20 and the mounting substrate 15 are juxtaposed on the reference plane 50a horizontally parallel to each other. A radio module 16 including the transmission module 14 and the antenna 30 is formed on the front surface (first principal surface) of the mounting substrate 15. A ground electrode 17 of the radio module 16 is formed on the back surface (a second principal surface located opposite the first principal surface) of the mounting substrate 15. The mounting substrate 15 has only to be composed of an insulating material. That is, an organic insulating material, an inorganic insulating material, or a composite insulating material may be used. Alternatively, the mounting substrate 15 may entirely be composed of a dielectric material or may be a combination of a dielectric material layer and a magnetic material layer. Specifically, any of various substrates such as a flexible mounting substrate (FPC substrate) or an FR4 substrate may be used as the mounting substrate 15. The mounting substrate 15 may be called a circuit substrate or a component mounted substrate. The battery 20 is peripherally covered by a metal housing (not shown in the drawings) shaped like a thin card. The battery 20 includes a plus terminal 21 and a minus terminal 22. The plus terminal 21 and the minus terminal 22 are drawn out through the side surface of the metal housing and parallel to the principal surfaces of the mounting substrate 15. The plus terminal 21 and the minus terminal 22 project toward and connect to the mounting substrate 15. Specifically, the plus terminal 21 connects to a power supply electrode (not shown in the drawings). The minus terminal 22 connects to the ground electrode 17.

The metal plate 40 covering a part of the battery 20 and a part of the antenna 30 is located parallel to the principal surfaces of the battery 20 and the principal surfaces of the radio module 16. The antenna characteristics (frequency characteristics, directionality, and the like) of the radio transmitter 10 are adjusted with the part of the battery 20 and the part of the antenna 30 covered by the metal plate 40. When the metal plate 40 is placed on the top surface of the part of the battery 20 and on the top surface of the part of the antenna 30, a parasitic capacitance may be formed between the part of the antenna 30 and the metal plate 40. Thus, compared to a conventional radio transmitter in which the metal plate is not placed on the top surface of the antenna, the present radio transmitter allows the frequency vs. gain characteristic of the antenna 30 to be designed for a wide band. For example, when the human body approaches the conventional radio transmitter, the frequency vs. gain characteristic of the antenna is varied under the effect of the human body, reducing the gain in a high frequency region. However, for the radio transmitter 10 according to the present embodiment, the frequency vs. gain characteristic of the antenna 30 is designed for a wide band and is thus unlikely to be affected by the human body. In particular, a possible decrease in gain in a high frequency region can be effectively inhibited. Furthermore, the metal plate 40 has a higher dielectric constant than the human body. Thus, even when the radio transmitter 10 with the part of the battery 20 and the part of the antenna 30 covered by the metal plate 40 is carried by the human body, the antenna characteristics are not substantially affected by the human body. Consequently, the frequency characteristics, directionality, and the like of the antenna 30 are not substantially affected.

In the present inventors' experiments, the reception sensitivity for radiation electric waves was measured at a point 1 m away from the radio transmitter. The directionality ratio (minimum gain/maximum gain) of the conventional radio transmitter was 0.02. In contrast, for the radio transmitter 10 according to the present embodiment, when 80% of the total area of the principal surface of the battery 20 was covered by the metal plate 40 and 80% of the total area of the formation area of the antenna 30 was covered by the metal plate 40, the directionality ratio (minimum gain/maximum gain) was 0.8. When 40% of the total area of the principal surface of the battery 20 was covered by the metal plate 40 and 40% of the total area of the formation area of the antenna 30 was covered by the metal plate 40, the directionality ratio (minimum gain/maximum gain) was 0.5. These were favorable results.

The above-described experiment results indicate that the improved directionality ratio of the radio transmitter 10 is obtained by increasing the rate of the total area of the principal surface of the battery 20 accounted for by the area of the part of the principal surface of the battery 20 covered by the metal plate 40 and the rate of the total area of the formation area of the antenna 30 accounted for by the area of the part of the formation area of the antenna 30 covered by the metal plate 40. In order to improve the directionality ratio, the total area of the battery 20 and the total formation area of the antenna 30 are covered by the metal plate 40.

The metal plate 40 is desirably located so as to cover, in addition to the part of the battery 20 and the part of the antenna 30, a part of the transmission module 14. The transmission module 14 is electromagnetically coupled to the antenna 30 to function as a radiation conductor. Consequently, with the part of the transmission module 14 covered by the metal plate 40, the frequency vs. gain characteristic of the antenna 30 can be designed for a broad band. Thus, advantageously, even when the radio transmitter 10 is carried by the human body, the antenna characteristics of the radio transmitter 10 are not substantially affected by the human body.

For the radio transmitter 10 according to the present embodiment, when 10% of the total area of the principal surface of the battery 20 was covered by the metal plate 40 and 100% of the total area of the formation area of the radio module 16 was covered by the metal plate 40, the directionality ratio (minimum gain/maximum gain) was 1.0. When 80% of the total area of the principal surface of the battery 20 was covered by the metal plate 40 and 80% of the total area of the formation area of the radio module 16 was covered by the metal plate 40, the directionality ratio (minimum gain/maximum gain) was 0.9. These results were favorable.

The above-described experiment results indicate that the improved directionality ratio of the radio transmitter 10 is obtained by increasing the rate of the total area of the formation area of the radio module 16 accounted for by the area of the part of the formation area of the radio module 16 covered by the metal plate 40. In order to improve the directionality ratio, the total area of the battery 20 and the total formation area of the radio module 16 are covered by the metal plate 40.

It should be noted that when the radio transmitter 10 is carried by the human body, one (front surface) of the two principal surfaces (front and back surfaces) of the external case 50 on which the metal plate 40 is located is directed toward the human body.

In the present embodiment, the battery 20 is electromagnetically coupled to the antenna 30, and the metal plate 40 is electromagnetically coupled to the antenna 30 and the battery 20. Thus, not only the antenna 30 but also the whole conductor potion including the battery 20 and the metal plate 40 functions as a radiation conductor. This results in antenna characteristics including proper nondirectionality. To be electromagnetically coupled to the antenna 30, the battery 20 may be, for example, connected to the antenna 30 using a conductive member, contacted with the antenna 30, or located in proximity to the antenna 30. Similarly, to be electromagnetically coupled to the antenna 30 and the battery 20, the metal plate 40 may be, for example, connected to the antenna 30 and the battery 20 using a conductive member, contacted with the antenna 30 and the battery 20, or located in proximity to the antenna 30 and the battery 20.

In the present embodiment, the antenna 30 is formed such that the main radiation direction of the antenna 30 is parallel to the direction of the principal surfaces of the metal plate (in particular, the direction of the Y axis parallel to the side surface of the battery 20 located opposite the side surface of the mounting substrate 15). Thus, radiating electric waves are prevented from being blocked by the metal plate 40. The material of the metal plate 40 is not particularly limited. However, a stainless material is preferable.

The ground electrode 17 of the radio module 16 is not formed on the front surface of the mounting substrate 15, one of the two principal surfaces (front and back surfaces) thereof, located opposite the metal plate 40, but on the back surface of the mounting substrate 15, the other principal surface thereof. This allows the distance between the metal plate 40 and the ground electrode 17 to be maximized, enabling a reduction in the possible parasitic capacitance formed between the metal plate 40 and the ground electrode 17. Thus, the possible degradation of the frequency characteristics of the antenna 30 caused by the parasitic capacitance can be effectively inhibited.

The antenna 30 includes a plurality of antenna elements 31, a plurality of conductor patterns 32, an electric feeding point 33, and an open end 34. The antenna elements 31, the electric feeding point 33, and the open end 34 are connected together via a conductor pattern 32. When the wavelength of the transmission signal corresponding to a radio frequency is defined as λ, the position of the electric feeding point 33 is set at a corner portion of the mounting substrate 15 so as to set the electrical length of the antenna 30 to λ/4. This antenna structure allows the radiation efficiency of the antenna 30 to be improved.

As shown in FIG. 4, each of the antenna elements 31 is composed of an antenna conductor 310 and an antenna substrate 311. The antenna conductor 310 has only to be a conductive, thin film and is not particularly limited. However, for example, a copper foil pattern may be used. The antenna substrate 311 is preferably a substrate (for example, a dielectric substrate) having a higher dielectric constant than the mounting substrate 15. Any of various substrates, for example, an FR4 substrate (effective relative dielectric constant ∈r=4.0; effective relative permeability μr=1.0) may be used. The mounting substrate 15 need not necessarily be separate from the antenna substrate 311. The mounting substrate 15 may be partly used as the antenna substrate 311. The antenna conductor 310 is helical, and the antenna substrate 311 has a thickness defined by two sides of an opening in the antenna. The antenna conductor 310 is wound in a direction parallel to the principal surfaces of the antenna substrate 311. More specifically, the antenna conductor 310 is composed of a first conductor piece 310a, a second conductor piece 310b, a third conductor piece 310c, and a fourth conductor piece 310d. The first conductor piece 310a is formed on the front surface (first principal surface) of the antenna substrate 311 at a predetermined pitch in one direction. The second conductor piece 310b is formed on the back surface (the second principal surface located opposite the first principal surface) of the antenna substrate 311 at the same pitch as that of the first conductor piece 310a in the same direction as that in which the first conductor piece 310a is formed. The ends of the first conductor piece 310a and the second conductor piece 310b are sequentially connected together, for helical connection, by the third conductor piece 310c and the fourth conductor piece 310d, which penetrate the antenna substrate 311 in the thickness direction. This configuration forms an antenna opening surrounded by the first conductor piece 310a, the second conductor piece 310b, the third conductor piece 310c, and the fourth conductor piece 310d. Magnetic fields generated through the antenna opening are perpendicular to an antenna opening surface. Thus, when the antenna opening surface is formed parallel to the thickness direction of the antenna, magnetic fields generated by the antenna 30 are parallel to the principal surfaces of the antenna substrate 311. Here, the thickness direction of the antenna substrate 311 means a direction perpendicular to the principal surfaces of the antenna substrate 311.

The antenna configuration shown in FIG. 4 is an example of the antenna 30. Any of various antenna configurations may be adopted. For example, the antenna 30 may be configured using a conductor pattern having any of various two- or three-dimensional shapes (a spiral shape, a helical shape, a roll shape, a linear shape, and a meander shape).

The antenna of the radio module 80 mounted in the terminal apparatus 70 preferably has the antenna design as that of the antenna 30 of the radio transmitter 10. Then, the frequency characteristics and directionality of the radio module 80 can be made similar to those of the radio transmitter 10. For example, if the antenna of the radio module 80 is composed of a plurality of antenna elements and a conductor pattern, the configuration and number of the antenna elements are preferably the same as those of the antenna elements 31 included in the antenna 30 of the radio transmitter 10. If the number of antenna elements in the radio transmitter 10 is different from that in the radio module 80, the frequency characteristics and directionality of the radio module 80 may be made similar to those of the radio transmitter 10 based on the length or width of the conductive pattern.

In the radio transmitter 10 according to the present embodiment, the antenna characteristics are pre-adjusted with the metal plate 40 located so as to cover the top surface of the part of the battery 20 and the top surface of the part of the antenna 30. Thus, advantageously, even when the radio transmitter 10 is carried by the human body, the antenna characteristics of the radio transmitter 10 are not substantially affected by the human body.

In the radio transmitter 10 according to the present embodiment, the battery 20 is electromagnetically coupled to the antenna 30, and the metal plate 40 is electromagnetically coupled to the antenna 30 and the battery 20. Thus, not only the antenna 30 but also the whole conductor potion including the battery 20 and the metal plate 40 functions as a radiation conductor. This results in antenna characteristics including proper nondirectionality.

In the radio transmitter 10 according to the present embodiment, the ground electrode 17 of the radio module 16 is not formed on the on the front surface of the mounting substrate 15, one of the two principal surfaces (front and back surfaces) thereof, located opposite the metal plate 40, but on the back surface of the mounting substrate 15, the other principal surface thereof. This allows the distance between the metal plate 40 and the ground electrode 17 to be maximized, enabling a reduction in the possible parasitic capacitance formed between the metal plate 40 and the ground electrode 17. This configuration is effective for inhibiting the possible degradation of the frequency characteristics of the antenna 30 caused by the parasitic capacitance formed between the metal plate 40 and the ground electrode 17.

The present application is based on Japanese priority application No. 2008-251130 filed on Sep. 29, 2008, the entire content of which is hereby incorporated by reference.

What is claimed is:

1. A radio transmitter comprising:
   a radio module;
   a battery from which power is fed to the radio module;
   a metal plate; and
   a mounting substrate having a first principal surface facing the metal plate and a second principal surface opposite to the first principal surface,
   wherein the radio module comprises a transmission module generating a transmission signal and an antenna configured to wirelessly transmit the transmission signal,
   the metal plate is located so as to cover a part of the battery and a part of the antenna,
   the battery is electromagnetically coupled to the antenna,
   a main radiation direction of the antenna is parallel to a principal surface of the metal plate,
   the radio module is formed on the first principal surface, and a ground electrode of the radio module is formed on the second principal surface, the mounting substrate being located between the radio module and the ground electrode, and
   the antenna has a spiral shape, a helical shape, or a meander shape on the mounting substrate, and has pieces on both the first and second principal surfaces of the mounting substrate.

2. The radio transmitter according to claim 1, wherein the metal plate is located so as to further cover a part of the transmission module.

3. The radio transmitter according to claim 1, wherein a position of an electric feeding point of the antenna is set at a corner portion of the mounting substrate so that for a wavelength λ of the transmission signal corresponding to a radio frequency, an electrical length of the antenna is set to λ/4.

4. The radio transmitter according to claim 1, further comprising a card type external case in which the radio module, the battery, and the metal plate are accommodated, wherein the radio module and the battery are juxtaposed inside the external case, and the metal plate is located parallel to the principal surface of the battery and the principal surface of the radio module.

5. The radio transmitter according to claim 1, wherein the antenna is helically wound on the mounting substrate.

6. The radio transmitter according to claim 1, wherein the metal plate is electromagnetically coupled to the antenna and the battery to function as a radiation conductor.

* * * * *